(12) United States Patent
Dekoning

(10) Patent No.: US 8,336,704 B2
(45) Date of Patent: Dec. 25, 2012

(54) GRAIN BAG EXTRACTOR AUGERS

(76) Inventor: Hubertus Dekoning, Neepawa (CA)

( * ) Notice: Subject to any disclaimer, the term of this patent is extended or adjusted under 35 U.S.C. 154(b) by 296 days.

(21) Appl. No.: 12/891,154

(22) Filed: Sep. 27, 2010

(65) Prior Publication Data

US 2011/0073440 A1 Mar. 31, 2011

(51) Int. Cl.
*B65G 65/22* (2006.01)
(52) U.S. Cl. ........ 198/513; 198/300; 198/657; 198/662; 414/412; 241/101.742
(58) Field of Classification Search .......... 198/300, 198/308.1, 309, 506, 513, 519, 657, 662, 198/666, 668; 414/403, 411, 412; 241/101.742
See application file for complete search history.

(56) References Cited

U.S. PATENT DOCUMENTS

| | | | | |
|---|---|---|---|---|
| 2,912,812 A | * | 11/1959 | Aasland | 56/76 |
| 4,089,300 A | * | 5/1978 | Keen et al. | 119/57.4 |
| 4,157,164 A | * | 6/1979 | Helm et al. | 241/101.72 |
| 7,861,851 B2 | * | 1/2011 | Dekoning | 198/513 |
| 7,997,849 B2 | * | 8/2011 | Twiestmeyer et al. | 414/412 |
| 8,251,630 B2 | * | 8/2012 | Hilsabeck et al. | 414/412 |
| 2011/0052352 A1 | * | 3/2011 | Lambertini | 414/310 |

* cited by examiner

*Primary Examiner* — Mark A Deuble
(74) *Attorney, Agent, or Firm* — Shumaker, Loop & Kendrick LLP

(57) ABSTRACT

An auger apparatus for moving in a forward direction into a quantity of granular material includes an enclosed housing having a horizontal main floor and right and left inclined floors sloping downward and outward from corresponding ends of the main floor, and walls extending upward from lower ends of the inclined floors. Right and left feed auger tubes extend laterally from the walls, and feed augers are mounted in the tubes. Outer front portions of the feed auger tubes are open to expose outer portions of the feed augers. A main auger tube extends upward from a top of the housing, and a main auger extends from the main floor upward through the main auger. A middle material moving apparatus is mounted forward of the housing and moves grain laterally to the exposed outer portions of the feed augers as the housing moves forward.

14 Claims, 3 Drawing Sheets

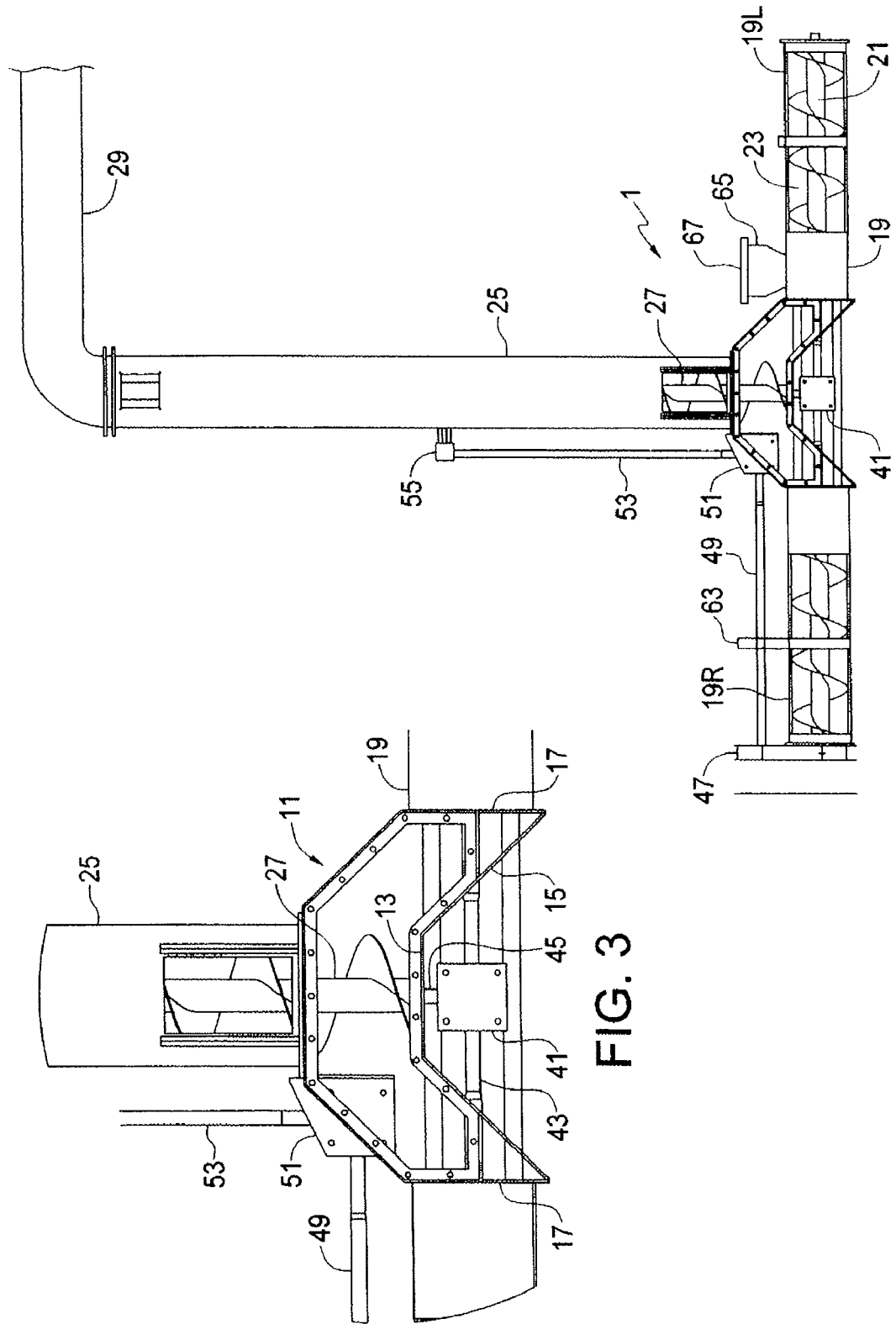

GRAIN BAG EXTRACTOR AUGERS

This invention is in the field of agricultural equipment and in particular an apparatus for removing grain from a large plastic bag, or from a pile on the ground.

BACKGROUND

Grain bags, typically made from plastic, are becoming popular for storing grain including corn, beans, and like agricultural produce. The bags come in packages that are attached to a loading machine which receives grain from a transport vehicle, and pushes the grain into the bag. As the bag fills, the machine moves ahead, such that the grain bag fills and stretches out behind the loading machine. A typical bag will be about nine or ten feet across, and 200 or more feet long.

To unload the bag, an extractor machine is provided that includes feed augers extending laterally right and left along the ground from the input end of an upright oriented main auger. The main auger can be oriented at an angle such that the discharge end is located at an elevated position to one side of the machine so that the main auger can discharge into a transport vehicle, or the main auger may have a bottom vertical section with a lateral section extending laterally from the top of the vertical section.

Thus to unload a bag, the end of the bag is cut open and the feed augers moved into the bag. The machine moves forward as the grain is collected by the feed augers and raised to the transport vehicle by the main auger. A knife at the top rear of the machine is oriented to slice the top of the bag as the machine moves forward as the grain is removed. In some machines the wheels of the machine pass over the inside of the bag, and in others the bag is taken up on a pinch roller so that grain left on the bag spills rearward and into the bag and is thus saved.

Such extractor machines can also be used for moving grain that is simply piled on the ground, or in a shed if access is sufficient. As with most such conveyors it is desired to have a high capacity to reduce the time required to unload the grain from the bag and transfer same to the transport vehicle.

SUMMARY OF THE INVENTION

It is an object of the present invention to provide an auger apparatus for a grain bag extractor that overcomes problems in the prior art.

In a first embodiment the present invention provides an auger apparatus for moving in a forward operating travel direction into a quantity of granular material to convey the granular material to a discharge location. The apparatus comprises an enclosed housing having a substantially horizontal main floor and right and left inclined floors sloping downward and outward from corresponding right and left ends of the main floor, and right and left walls extending upward from lower ends of the corresponding right and left inclined floors. Right and left feed auger tubes extend laterally from the corresponding right and left walls, and right and left feed augers are mounted in the feed auger tubes. Outer front portions of the feed auger tubes are open to expose outer portions of the feed augers. A main auger tube extends upward from a top of the housing, and a main auger extends from the main floor upward through the main auger tube to a discharge end of the main auger tube. A middle material moving apparatus is mounted forward of the housing and is operative to move grain laterally right and left to the exposed outer portions of the right and left feed augers as the housing moves forward into the granular material. A drive assembly is connectable to a power source to rotate the feed augers and main auger.

In a second embodiment the present invention provides a grain bag extractor apparatus for movement in a forward operating travel direction into a quantity of grain stored in a bag to extract the grain from the bag and convey the extracted grain into a transport vehicle. The apparatus comprises a frame adapted for travel in the operating travel direction. An enclosed housing is mounted on a forward portion of the frame, the housing having a substantially horizontal main floor and right and left inclined floors sloping downward and outward from corresponding right and left ends of the main floor, and right and left walls extending upward from lower ends of the corresponding right and left inclined floors. Right and left feed auger tubes extend laterally from the corresponding right and left walls, and right and left feed augers are mounted in the feed auger tubes. Outer front portions of the feed auger tubes are open to expose outer portions of the feed augers. A main auger tube extends upward from a top of the housing, and a main auger extends from the main floor upward through the main auger tube to a discharge end of the main auger tube. A middle grain moving apparatus is mounted forward of the housing and is operative to move grain laterally right and left to the exposed outer portions of the right and left feed augers as the housing moves forward into the grain. A drive assembly is connectable to a power source to rotate the feed augers and main auger.

The lower input end of the main auger is thus enclosed in the housing, and the feed augers push grain into the housing keeping the housing full and forcing grain into the main auger tube and thus increasing the rate of material being carried away by the main auger compared to prior art auger arrangements where the feed augers simply move the grain toward the main auger input, which is not confined.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 2 is a front view of the embodiment of FIG. 1;

FIG. 3 is a larger scale front view of the housing of the embodiment of FIG. 1 and the connection of the augers to the drive;

DETAILED DESCRIPTION OF THE ILLUSTRATED EMBODIMENTS

Figure 1:
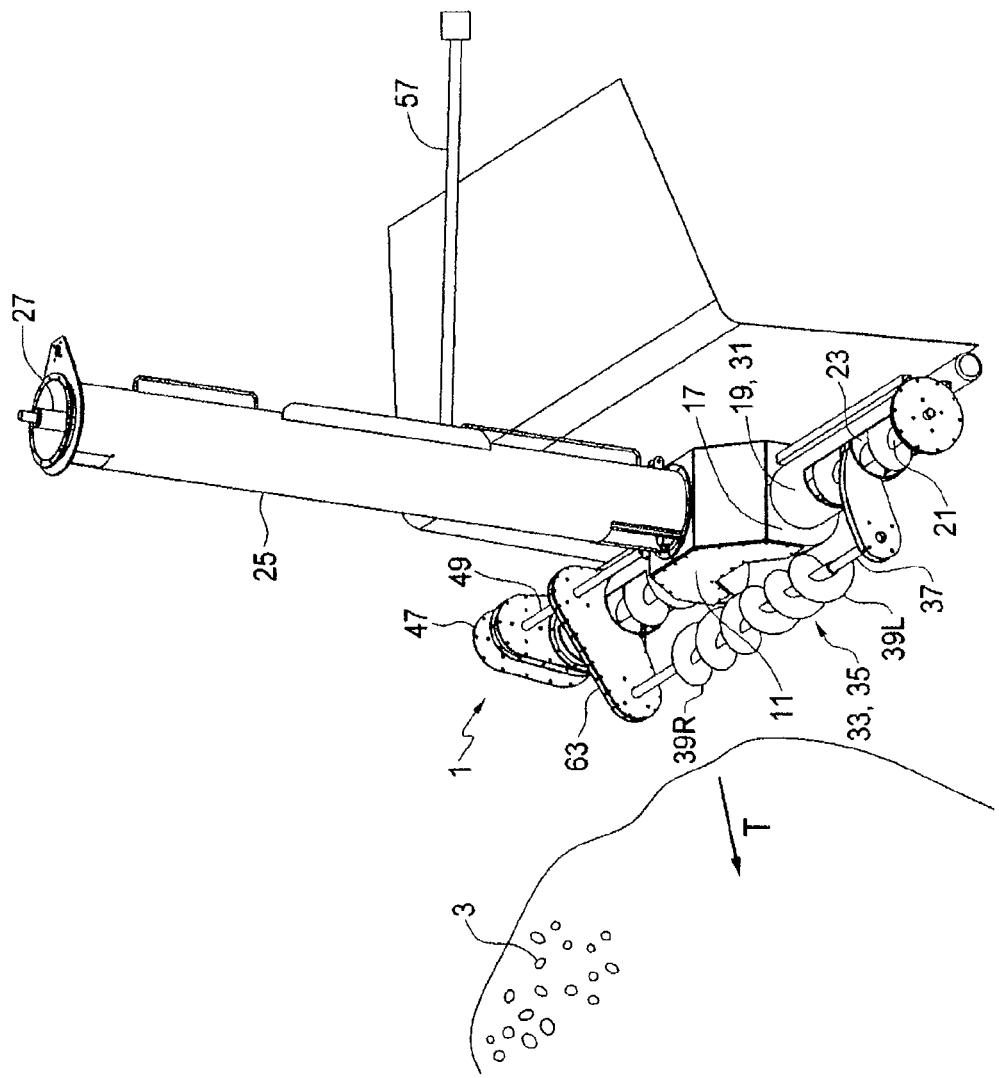
FIG. 1 is a front perspective view of an embodiment of an auger apparatus of the present invention beside a pile of grain.
Figure 5:
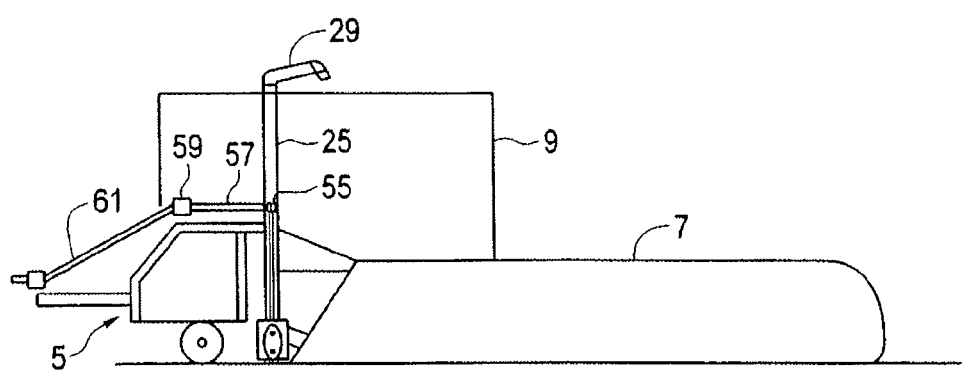
FIG. 5 is a schematic side view of the embodiment of FIG. 1 mounted on the frame of a bag extractor apparatus.

FIGS. 1-3 schematically illustrate an embodiment of an auger apparatus 1 of the present invention for moving in a forward operating travel direction T into a quantity of granular material 3, such as the pile of grain 3, to convey the granular material to a discharge location. A particular use for the apparatus 1 is with a grain bag extractor 5 for movement into a quantity of grain stored in a bag 7 to extract the grain from the bag and convey the extracted grain to a discharge location oriented to discharge into a transport vehicle 9, as schematically illustrated in FIG. 5. The apparatus 1 is mounted on a frame of the grain bag extractor 5, which is mounted on wheels for travel in the operating travel direction T.

The apparatus 1 comprises an enclosed housing 11 having a substantially horizontal main floor 13 and right and left inclined floors 15 sloping downward and outward from corresponding right and left ends of the main floor 13, and right and left walls 17 extending upward from lower ends of the corresponding right and left inclined floors 15.

Right and left feed auger tubes 19 extend laterally from the corresponding right and left walls 17, and right and left feed augers 21 are mounted in the feed auger tubes 19. Outer front portions 23 of the feed auger tubes 19 are open to expose outer portions of the feed augers 19. A main auger tube 25 extends upward from a top of the housing 11 and a main auger 27 extends from the main floor 13 upward through the main auger tube 25 to a discharge end of the main auger tube 25. The illustrated main auger tube 25 is substantially vertical, and so a lateral auger section 29 is added to the top end of the main auger tube 25 to carry the grain extracted from the bag 7 laterally to a discharge location oriented to discharge into the transport vehicle 9.

The feed augers 21 thus gather grain (or other granular material) in through the open front portions 23 of the feed auger tubes 19 and push the grain into the closed inner portions 31, then up the inclined floors 15 to the bottom end of the main auger 27. The feed augers 21 essentially force the grain into the enclosed housing 11 and thus into the main auger 27, keeping the housing 11 filled with grain and thus increasing the amount of grain carried up the main auger tube 25 by the main auger 27.

As can be seen in the figures, the middle portion of the apparatus 1 has no exposed augers to take away grain as the apparatus 1 moves forward, and so a middle material moving apparatus 33 is mounted forward of the housing 11 and is operative to move grain laterally right and left to the exposed outer portions of the right and left feed augers 21 as the housing 11 moves forward into the grain.

In the apparatus 1 of FIGS. 1-3, the middle material moving apparatus 33 comprises a middle feed auger 35 mounted forward of the housing 11. The middle feed auger 35 comprises a middle feed auger shaft 37 oriented substantially horizontally and perpendicular to the operating travel direction T, and having oppositely directed middle feed auger flighting 39R, 39L on right and left portions of the middle feed auger shaft 37. Thus grain contacted by the feed auger flighting 39R on the right portion of the shaft 37 moves outward to the right to the open outer front portions 23 of the right feed auger tube 19R and grain contacted by the feed auger flighting 39L on the left portion of the shaft 37 moves outward to the left to the open outer front portion 23 of the left feed auger tube 19L. Thus grain in the middle is carried to each side and then through the feed auger tubes 19 and up the main tube 25.

Figure 4:
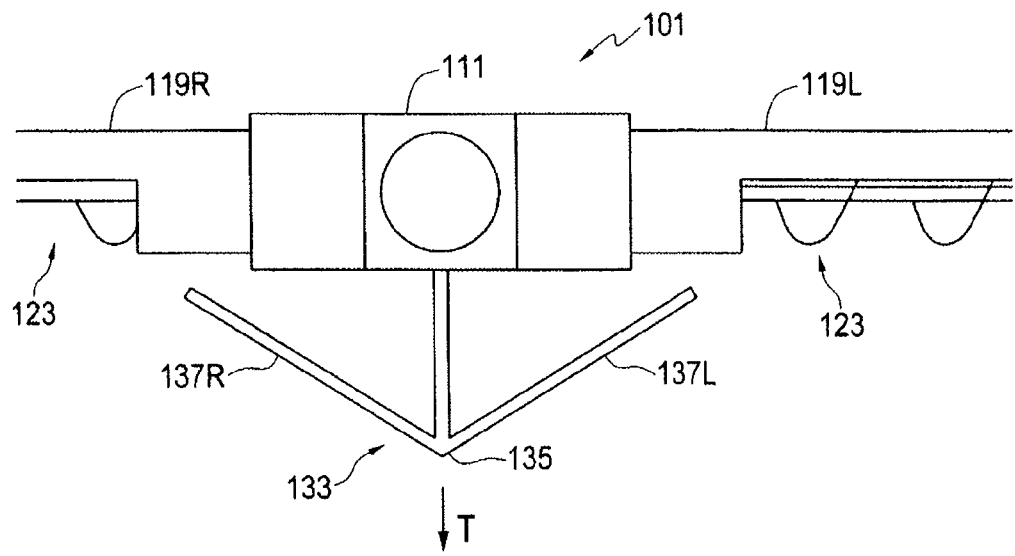
FIG. 4 is a schematic top view of an alternate embodiment of the present invention with a middle material moving apparatus comprising a V-shaped divider.

FIG. 4 schematically illustrates an alternate apparatus 101 wherein the middle material moving apparatus 133 comprises a V-shaped divider 135 oriented such that right and left legs 137R, 137L of the divider 135 direct grain to corresponding open outer front portions 123 of the right feed auger tubes 119R, 119L on right and left sides of the housing 111 as the housing 111 moves forward into the grain.

A drive assembly is connectable to a power source, typically the power take off (PTO) of a tractor to which the extractor apparatus 5 is hitched, to rotate the feed augers 21 and main auger 27. In the apparatus 1 illustrated in FIGS. 1-3, the drive comprises a lower gear box 41 mounted under the main floor 13 of the housing 11 between the right and left inclined floors 15. The lower gear box 41 is connected to shafts 43 of the right and left feed augers 21 and shaft 45 of the main auger 27 that extend through sealed apertures in the corresponding right and left inclined floors 15 and main floor 13. Thus connecting one of the right and left feed augers 21 to the power source will to drive the other feed auger 21 and main auger 27 through the lower gear box 41.

In the illustrated apparatus 1, the driven right feed auger 21R is connected by a sealed chain or belt drive 47 at an outer end thereof to a horizontal cross drive shaft 49 extending from the outer end of the driven right feed auger 21R to an upper gear box 51 adjacent to the housing 11. A main drive shaft 53 is connected at a lower end thereof to the upper gear box 51 and extends upward to an upper end thereof connectable to the power source through another gear box 55 that is connected in turn, through yet another shaft 57 and gear box 59 as schematically illustrated in FIG. 5, to a PTO shaft 61 connectable to the tractor PTO.

In the illustrated apparatus 1, the middle feed auger shaft 37 is driven by connecting a middle portion of the horizontal cross drive shaft 49 to an outer end of the middle feed auger shaft 37 by a sealed chain or belt drive 63.

To facilitate clean up of small quantities of grain during or at the end of a job, a clean up hopper 65 is mounted over an opening in a top side of the inner closed portion 31 of one of the right and left feed auger tubes 19. Grain poured into the hopper 65 enters the auger tube 19 and is carried away. A lid 67 is operative to open and close an open top end of the hopper 65.

The open lower input end of the main auger 27 extends up from the main floor vertically through the housing 11. Grain is forced up the inclined floors 15 and into the confined volume of the housing and thus into the main auger 27 which then carries an increased rate of grain or granular material up the main auger tube 25 compared to open auger inputs which are not confined and force fed in the manner of the present invention.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An auger apparatus for moving in a forward operating travel direction into a quantity of granular material to convey the granular material to a discharge location, the apparatus comprising:

an enclosed housing having a substantially horizontal main floor and right and left inclined floors sloping downward and outward from corresponding right and left ends of the main floor, and right and left walls extending upward from lower ends of the corresponding right and left inclined floors;

right and left feed auger tubes extending laterally from the corresponding right and left walls, and right and left feed augers mounted in the feed auger tubes, wherein outer front portions of the feed auger tubes are open to expose outer portions of the feed augers;

a main auger tube extending upward from a top of the housing, and a main auger extending from the main floor upward through the main auger tube to a discharge end of the main auger tube;

a middle material moving apparatus mounted forward of the housing and operative to move grain laterally right and left to the exposed outer portions of the right and left feed augers as the housing moves forward into the granular material; and a drive assembly connectable to a power source to rotate the feed augers and main auger.

2. The apparatus of claim 1 wherein the middle material moving apparatus comprises a middle feed auger mounted forward of the housing, the middle feed auger comprising a middle feed auger shaft oriented substantially horizontally and perpendicular to the operating travel direction, and having oppositely directed middle feed auger flighting on right and left portions of the middle feed auger shaft.

3. The apparatus of claim 1 wherein the middle material moving apparatus comprises a V-shaped divider oriented such that right and left legs of the divider direct grain to corresponding right and left sides of the housing.

4. The apparatus of claim 1 wherein the drive comprises a lower gear box mounted under the main floor of the housing between the right and left inclined floors, the lower gear box connected to shafts of the right and left feed augers and the main auger that extend through the corresponding right and left inclined floors and main floor, and wherein a driven one of the right and left feed augers is connectable to the power source to drive the feed augers and main auger.

5. The apparatus of claim 4 wherein the driven feed auger is connected at an outer end thereof to a horizontal cross drive shaft extending from the outer end of the driven feed auger to an upper gear box adjacent to the housing, and wherein a main drive shaft is connected at a lower end thereof to the upper gearbox and extends upward to an upper end thereof connectable to the power source.

6. The apparatus of claim 5 wherein the middle material moving apparatus comprises a middle feed auger mounted forward of the housing, the middle feed auger comprising a middle feed auger shaft oriented substantially horizontally and perpendicular to the operating travel direction, and having oppositely directed middle feed auger fighting on right and left portions of the middle feed auger shaft, and comprising a drive connecting a middle portion of the horizontal cross drive shaft to an outer end of the middle feed auger shaft.

7. The apparatus of claim 1 comprising a clean up hopper mounted over an opening in a top side of an inner closed portion of one of the right and left feed auger tubes such that grain poured into the hopper enters the auger tube; and a lid operative to open and close an open top end of the hopper.

8. A grain bag extractor apparatus for movement in a forward operating travel direction into a quantity of grain stored in a bag to extract the grain from the bag and convey the extracted grain into a transport vehicle, the apparatus comprising:

a frame adapted for travel in the operating travel direction;

an enclosed housing mounted on a forward portion of the frame, the housing having a substantially horizontal main floor and right and left inclined floors sloping downward and outward from corresponding right and left ends of the main floor, and right and left walls extending upward from lower ends of the corresponding right and left inclined floors;

right and left feed auger tubes extending laterally from the corresponding right and left walls, and right and left feed augers mounted in the feed auger tubes, wherein outer front portions of the feed auger tubes are open to expose outer portions of the feed augers;

a main auger tube extending upward from a top of the housing, and a main auger extending from the main floor upward through the main auger tube to a discharge end of the main auger tube;

a middle grain moving apparatus mounted forward of the housing and operative to move grain laterally right and left to the exposed outer portions of the right and left feed augers as the housing moves forward into the grain; and a drive assembly connectable to a power source to rotate the feed augers and main auger.

9. The apparatus of claim 8 wherein the middle material moving apparatus comprises a middle feed auger mounted forward of the housing, the middle feed auger comprising a middle feed auger shaft oriented substantially horizontally and perpendicular to the operating travel direction, and having oppositely directed middle feed auger flighting on right and left portions of the middle feed auger shaft.

10. The apparatus of claim 8 wherein the middle material moving apparatus comprises a V-shaped divider oriented such that right and left legs of the divider direct grain to corresponding right and left sides of the housing.

11. The apparatus of claim 8 wherein the drive comprises a lower gear box mounted under the main floor of the housing between the right and left inclined floors, the lower gear box connected to shafts of the right and left feed augers and the main auger that extend through the corresponding right and left inclined floors and main floor, and wherein a driven one of the right and left feed augers is connectable to the power source to drive the feed augers and main auger.

12. The apparatus of claim 11 wherein the driven feed auger is connected at an outer end thereof to a horizontal cross drive shaft extending from the outer end of the driven feed auger to an upper gear box adjacent to the housing, and wherein a main drive shaft is connected at a lower end thereof to the upper gearbox and extends upward to an upper end thereof connectable to the power source.

13. The apparatus of claim 12 wherein the middle material moving apparatus comprises a middle feed auger mounted forward of the housing, the middle feed auger comprising a middle feed auger shaft oriented substantially horizontally and perpendicular to the operating travel direction, and having oppositely directed middle feed auger flighting on right and left portions of the middle feed auger shaft, and comprising a drive connecting a middle portion of the horizontal cross drive shaft to an outer end of the middle feed auger shaft.

14. The apparatus of claim 8 comprising a clean up hopper mounted over an opening in a top side of an inner closed portion of one of the right and left feed auger tubes such that grain poured into the hopper enters the auger tube; and a lid operative to open and close an open top end of the hopper.

* * * * *